US012687237B2

(12) United States Patent
Henker

(10) Patent No.: US 12,687,237 B2
(45) Date of Patent: Jul. 21, 2026

(54) VALVE ASSEMBLY

(71) Applicant: Illinois Tool Works Inc., Glenview, IL (US)

(72) Inventor: Michael Henker, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 21 days.

(21) Appl. No.: 19/038,517

(22) Filed: Jan. 27, 2025

(65) Prior Publication Data

US 2026/0160354 A1 Jun. 11, 2026

(30) Foreign Application Priority Data

Feb. 1, 2024 (CN) .......................... 202410149602.7

(51) Int. Cl.
*F16K 31/06* (2006.01)
*F16K 31/10* (2006.01)
*F16K 11/085* (2006.01)

(52) U.S. Cl.
CPC ........ *F16K 31/0603* (2013.01); *F16K 31/105* (2013.01); *F16K 11/0853* (2013.01)

(58) Field of Classification Search
CPC . F16K 31/0603; F16K 31/105; F16K 11/0853
See application file for complete search history.

(56) References Cited

U.S. PATENT DOCUMENTS 4,474,149 A * 10/1984 Idogaki ............... F16K 31/0682
                                            123/308
6,892,698 B2 * 5/2005 Kino ..................... F02D 9/1035
                                            123/403
(Continued)

FOREIGN PATENT DOCUMENTS

CN        103174866 B    8/2015
CN        217603472 U   10/2022
KR     20240044909 A     4/2024

*Primary Examiner* — Michael R Reid
*Assistant Examiner* — Christopher D Ballman
(74) *Attorney, Agent, or Firm* — McAndrews, Held & Malloy, Ltd.

(57) ABSTRACT

The present disclosure provides a valve assembly, including a housing, a valve body, a drive train assembly, a first magnetic component, a driving component, and a second magnetic component. The housing defining a first cavity and a second cavity which are independent of each other. The valve body is disposed in the first cavity. The drive train assembly is disposed in the first cavity to drive the valve body to rotate. The first magnetic component is disposed in the first cavity and disposed on the drive train assembly. The driving component is disposed in the second cavity. The second magnetic component is disposed in the second cavity and disposed on the driving component. The first magnetic component and the second magnetic component are configured such that the first magnetic component can rotate correspondingly as the second magnetic component rotates. The driving component is capable of driving the valve body to rotate by means of the first magnetic component, the second magnetic component and the drive train assembly. The present disclosure provides a valve assembly, which transmits power by means of the first magnetic component and the second magnetic component disposed in the first cavity and the second cavity, respectively, thereby eliminating the need for a seal while protecting the driving component.

16 Claims, 14 Drawing Sheets

(56)     References Cited

U.S. PATENT DOCUMENTS

| | | | | |
|---|---|---|---|---|
| 7,316,216 | B2 * | 1/2008 | Neise | F16K 31/043 |
| | | | | 123/337 |
| 8,136,789 | B2 * | 3/2012 | Staev | F16K 31/04 |
| | | | | 251/249.5 |
| 10,238,427 | B2 * | 3/2019 | Wentz | A61B 17/7016 |
| 10,385,984 | B2 * | 8/2019 | Geffert | F16K 31/12 |
| 11,396,953 | B2 * | 7/2022 | Ma | F16K 27/041 |
| 11,708,913 | B2 * | 7/2023 | Ma | F16K 31/535 |
| | | | | 251/249.5 |
| 11,808,362 | B2 * | 11/2023 | Dehrmann | F01P 5/12 |
| 12,092,223 | B2 * | 9/2024 | Hitsuyu | F16K 37/0033 |
| 12,297,925 | B2 * | 5/2025 | Park | F16K 31/535 |
| 2005/0232074 | A1 * | 10/2005 | Higashihara | B01F 33/81 |
| | | | | 422/224 |
| 2021/0254739 | A1 | 8/2021 | Ma | |
| 2021/0332893 | A1 | 10/2021 | Ma | |

* cited by examiner

VALVE ASSEMBLY

RELATED APPLICATION

The present application claims the benefit of Chinese Patent Application No. 202410149602.7, filed Feb. 1, 2024, titled "Valve Assembly," the contents of which are hereby incorporated by reference.

TECHNICAL FIELD

The present disclosure relates to the field of valve assemblies.

BACKGROUND

The existing valve assembly includes a housing, a valve body disposed in the housing, and a driving component disposed in the housing. The valve body can rotate relative to the housing, to enable on/off of a fluid. Since the driving component cannot contact the fluid, it is necessary to provide a seal in the housing to isolate the fluid from the driving component.

SUMMARY

The present disclosure relates generally to a valve assembly, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1A:
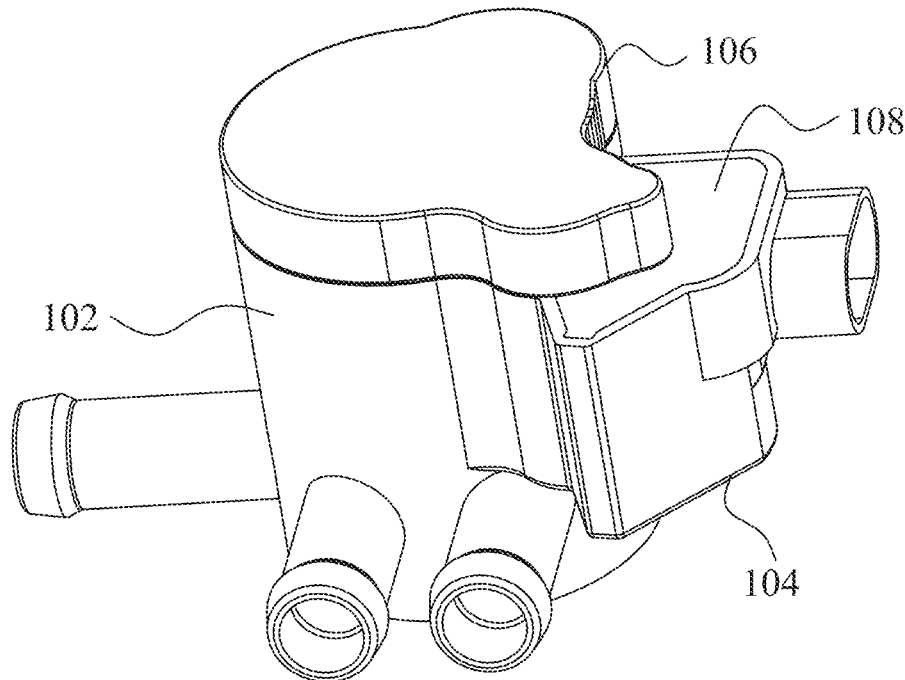
FIG. 1A is a perspective view of a first embodiment of a valve assembly of the present disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

Exemplary embodiments of the present disclosure can solve at least some of the above problems. The present disclosure provides a valve assembly, including a housing, a valve body, a drive train assembly, a first magnetic component, a driving component, and a second magnetic component. The housing defines a first cavity and a second cavity which are independent of each other. The valve body is disposed in the first cavity. The drive train assembly is disposed in the first cavity and configured to be capable of driving the valve body to rotate. The first magnetic component is disposed in the first cavity and disposed on the drive train assembly. The driving component is disposed in the second cavity. The second magnetic component is disposed in the second cavity and disposed on the driving component. The first magnetic component and the second magnetic component are configured such that the first magnetic component can rotate correspondingly as the second magnetic component rotates. The driving component is capable of driving the valve body to rotate by means of the first magnetic component, the second magnetic component and the drive train assembly.

According to the valve assembly described above, the driving component has an output torque, and the first magnetic component and the second magnetic component are capable of transmitting the output torque of the driving component to the drive train assembly. The drive train assembly is configured to convert the output torque into a valve body torque capable of driving the valve body to rotate. The output torque is less than the valve body torque.

According to the valve assembly described above, the drive train assembly includes a first gear and a final gear, and the first gear engages with the final gear. The first magnetic component is disposed on the first gear, and the final gear engages with a valve gear disposed on the valve body.

According to the valve assembly described above, the drive train assembly includes a first gear, a final gear and at least one intermediate gear, and the first gear is capable of driving the final gear to rotate by means of the at least one intermediate gear. The first magnetic component is disposed on the first gear, and the final gear is configured to drive the valve body to rotate.

According to the valve assembly described above, the second magnetic component drives the first magnetic component to rotate by means of a magnetic attraction force.

According to the valve assembly described above, the first magnetic component is stationary relative to the second magnetic component.

According to the valve assembly described above, each of the first magnetic component and the second magnetic component has a first polarity and a second polarity which are attractive to each other. The first polarity of the first magnetic component directly faces the second polarity of the second magnetic component, and the first polarity of the second magnetic component directly faces the second polarity of the first magnetic component.

According to the valve assembly described above, each of the first magnetic component and the second magnetic component has a first polarity and a second polarity which are attractive to each other. The first polarity of the first magnetic component is closer to the second polarity of the second magnetic component than the second polarity of the first magnetic component, and the first polarity of the second magnetic component is farther away from the first polarity of the first magnetic component than the second polarity of the second magnetic component.

According to the valve assembly described above, the first magnetic component and the second magnetic component are cylindrical.

According to the valve assembly described above, the housing includes a separator disposed between the first cavity and the second cavity. The separator is a flat plate, and the first magnetic component and the second magnetic component are disposed on two opposite sides of the separator.

According to the valve assembly described above, the first magnetic component is cylindrical, the second magnetic component is annular, and the second magnetic component is disposed and surrounded by the first magnetic component.

According to the valve assembly described above, the housing includes a separator disposed between the first cavity and the second cavity. The first magnetic component and the second magnetic component are disposed on two opposite sides of the separator. The separator is provided with a counter bore, and the first magnetic component is received in the counter bore.

According to the valve assembly described above, the driving component has a rotatable output end, and the second magnetic component is disposed on the output end.

According to the valve assembly described above, the driving component is a motor.

According to the valve assembly described above, the housing includes at least two tubes in communication with the first cavity, and a fluid is capable of flowing into the first cavity through one of the at least two tubes. The valve body is provided with at least one opening, and the at least one opening is configured to enable the at least two tubes to communicate with each other, such that the fluid can flow out of the first cavity from the other of the at least two tubes.

According to the valve assembly described above, the valve assembly further includes an additional plate and a valve gear. The additional plate is disposed in the first cavity. The valve gear is connected to the valve body and engages with the drive train assembly. The valve body and the drive train assembly are respectively disposed on two opposite sides of the additional plate, and the valve body and the valve gear are respectively disposed on the two opposite sides of the additional plate.

The present disclosure provides a valve assembly, which transmits power by means of the first magnetic component and the second magnetic component disposed in the first cavity and the second cavity, respectively, thereby eliminating the need for a seal while protecting the driving component.

Figure 1B:
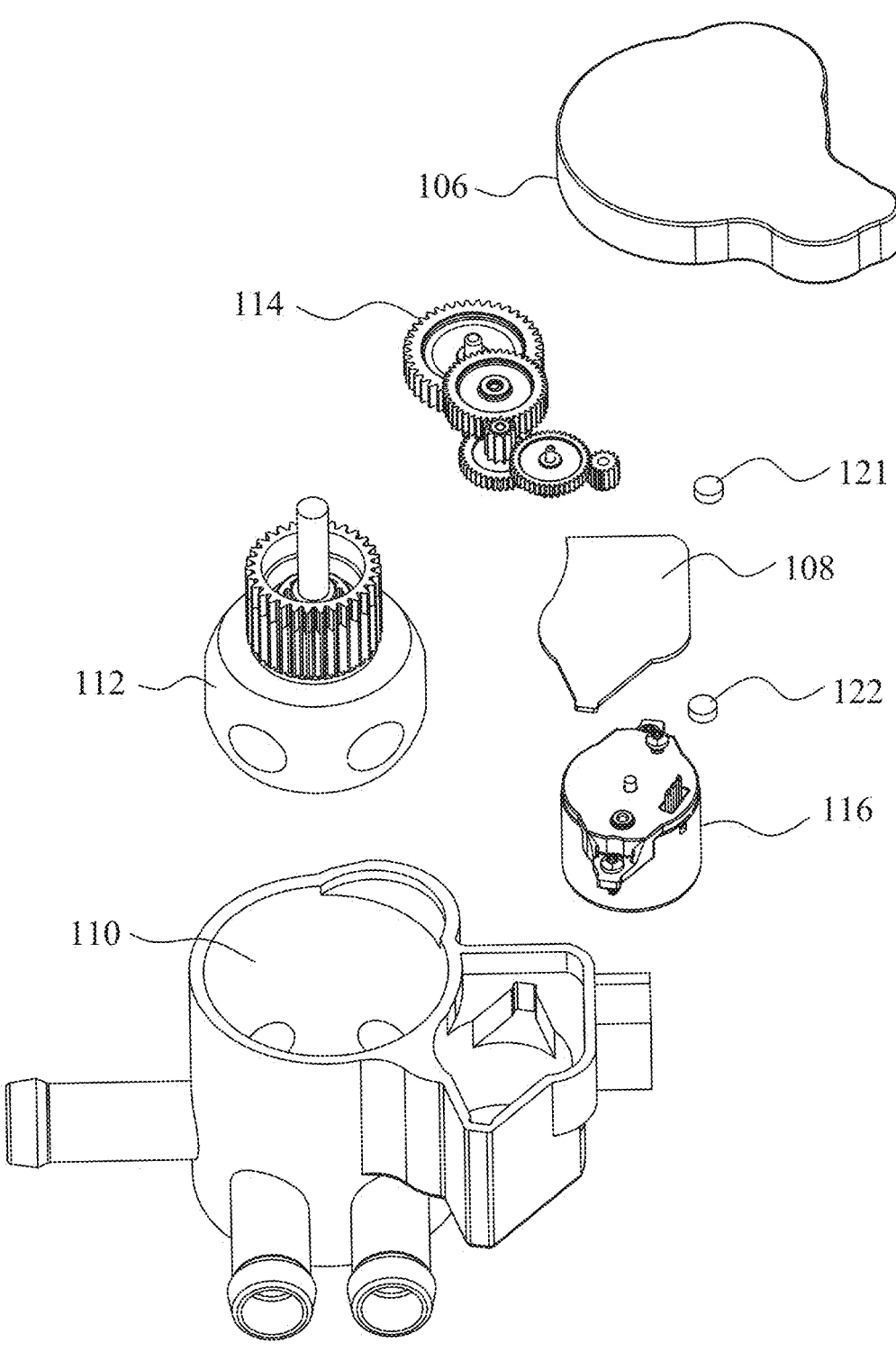
FIG. 1B is an exploded view of the valve assembly shown in FIG. 1A.

FIG. 1A is a perspective view of a first embodiment of a valve assembly of the present disclosure. FIG. 1B is an exploded view of the valve assembly shown in FIG. 1A. As shown in FIGS. 1A-1B, the valve assembly includes a housing 102, a valve body 112, a drive train assembly 114, a driving component 116, a first magnetic component 121, and a second magnetic component 122. The housing 102 defines a cavity 110. The valve body 112, the drive train assembly 114, the driving component 116, the first magnetic component 121 and the second magnetic component 122 are all disposed in the cavity 110. The driving component 116 can drive the valve body 112 to rotate by means of the drive train assembly 114, the first magnetic component 121 and the second magnetic component 122. The housing 102 includes a housing main body 104, an upper cover 106, and a separator 108. The housing main body 104, the upper cover 106 and the separator 108 together define the cavity 110.

Figure 2:
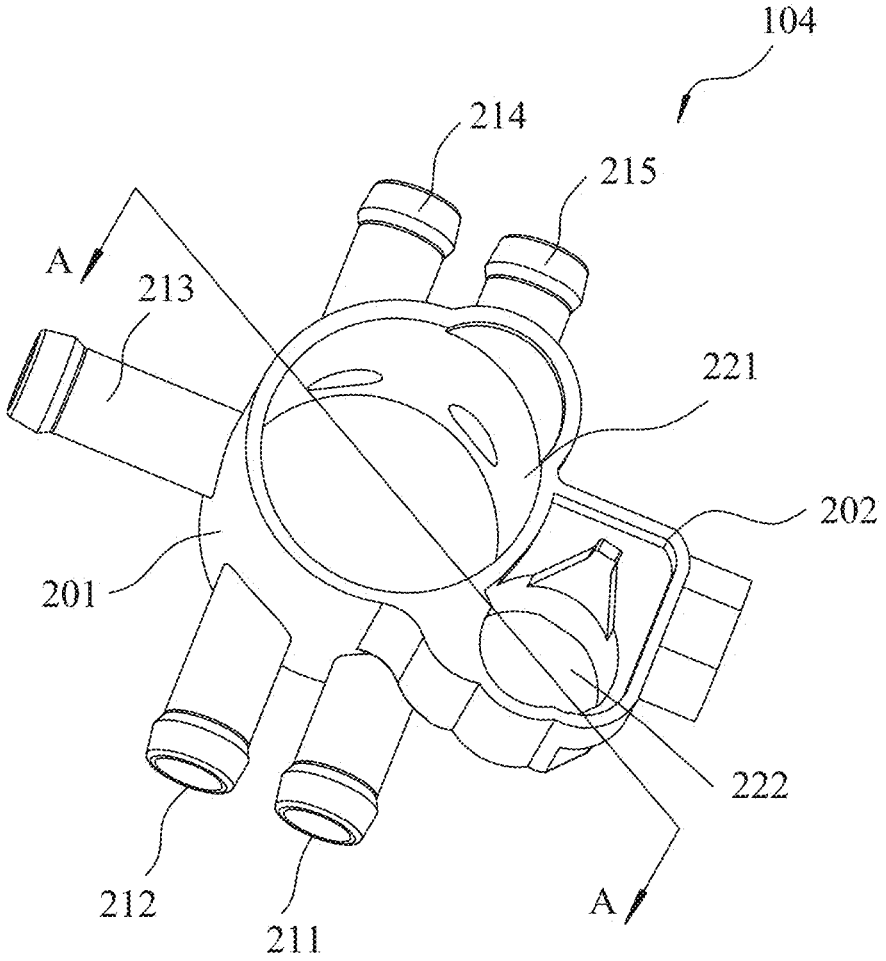
FIG. 2 is a perspective view of a housing main body shown in FIG. 1B.

FIG. 2 is a perspective view of the housing main body 104 shown in FIG. 1B. As shown in FIG. 2, the housing main body 104 includes a first main body 201, a second main body 202, a first tube 211, a second tube 212, a third tube 213, a fourth tube 214, and a fifth tube 215. The first main body 201 is substantially a cylinder having an upper opening. The first main body 201 defines a first main body cavity 221 having the upper opening for receiving the valve body 112, the drive train assembly 114 and the first magnetic component 121. The first tube 211, the second tube 212, the third tube 213, the fourth tube 214 and the fifth tube 215 are all hollow tubes and are all connected to the first main body 201 so as to communicate with the first main body cavity 221. The first tube 211 and the second tube 212 are disposed approximately on a front side of the first main body 201, the third tube 213 is disposed approximately on a left side of the first main body 201, and the fourth tube 214 and the fifth tube 215 are disposed approximately on a rear side of the first main body 201. The second main body 202 is disposed on a right side of the first main body 201 and is connected to the first main body 201. The second main body 202 is substantially a cuboid. The second main body 202 defines a second cavity 222 having an upper opening for receiving the driving component 116 and the second magnetic component 122.

It should be noted that although the housing main body 104 shown in the present disclosure includes five tubes, it can be understood by those skilled in the art that the housing main body 104 including at least two tubes is within the scope of protection of the present disclosure.

It should also be noted that although the first main body 201 shown in the present disclosure is substantially a cylinder, it can be understood by those skilled in the art that other shapes of the first main body 201 are also within the scope of protection of the present disclosure.

Figure 3:
FIG. 3 is a cross-sectional view of a housing shown in FIG. 1B taken along section line A-A of FIG. 2.
Figure 3:
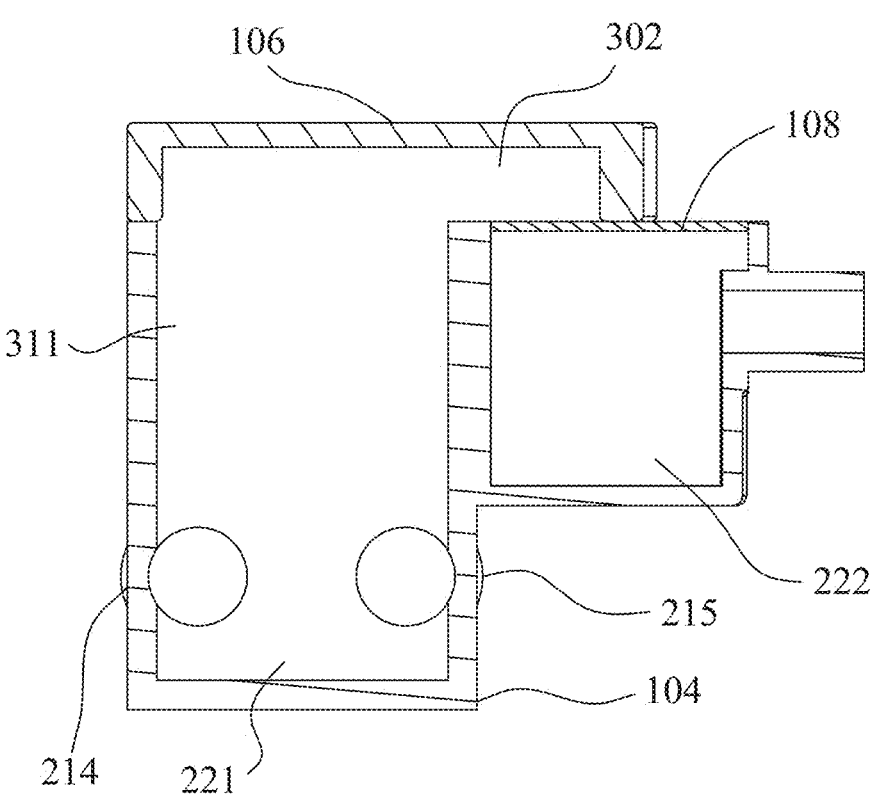

FIG. 3 is a cross-sectional view of the housing 102 shown in FIG. 1B taken along section line A-A of FIG. 2. As shown in FIG. 3, the separator 108 is substantially a flat plate. The shape of the separator 108 corresponds to the shape of the upper opening of the second cavity 222 such that the separator 108 can cover on the second main body 202 and close the second cavity 222. The upper cover 106 defines an upper cover cavity 302 having a lower opening. The upper cover 106 covers on the first main body 201 and the separator 108, so as to close the first main body cavity 221. The upper cover cavity 302 and the first main body cavity 221 together form the first cavity 311.

In this way, the housing 102 defines the first cavity 311 and the second cavity 222 which are independent of each other. The first tube 211, the second tube 212, the third tube 213, the fourth tube 214 and the fifth tube 215 are all in communication with the first cavity 311, but are not in communication with the second cavity 222.

It should also be noted that although the first main body 201 shown in the present disclosure defines the first main body cavity 221 having an upper opening and the second main body 202 defines the second cavity 222 having an upper opening, it can be understood by those skilled in the art that the present disclosure does not intend to define the locations of the openings on the first main body cavity 221 and the second cavity 222.

Figure 4:
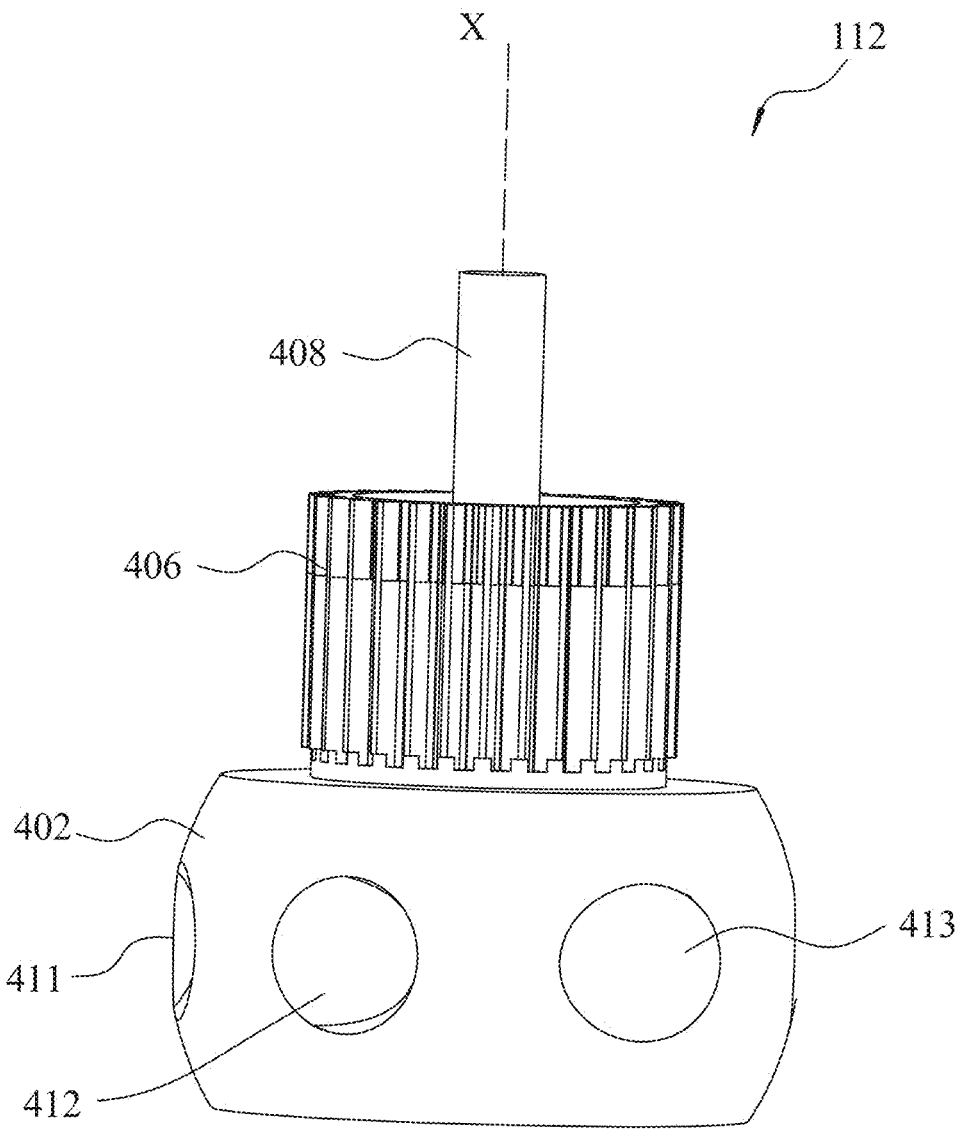
FIG. 4 is a perspective view of a valve body shown in FIG. 1B.

FIG. 4 is a perspective view of the valve body 112 shown in FIG. 1B. As shown in FIG. 4, the valve body 112 includes a valve main body 402, a valve gear 406, and a valve shaft 408. The valve main body 402 is substantially in the shape of a sphere with upper and lower ends truncated. The valve main body 402 defines a valve cavity (not shown). A spherical surface of the valve main body 402 is provided with a first opening 411, a second opening 412 and a third opening 413. The first opening 411, the second opening 412 and the third opening 413 are all in communication with the valve cavity. The valve main body 402 is disposed in the first cavity 311 and can rotate about an axis X of the valve body 112 relative to the housing 102. When the valve main body 402 rotates relative to the housing 102 to a communication position, two of the first opening 411, the second opening 412 and the third opening 413 of the valve main body 402 are respectively in communication with two of the first tube 211, the second tube 212, the third tube 213, the fourth tube 214 and the fifth tube 215, thereby forming a communication path to communicate at least two of the five tubes. In other words, two of the first opening 411, the second opening 412 and the third opening 413 on the valve main body 402 enable a fluid to flow from one of the five tubes into the first cavity 311 and from another one of the five tubes out of the first cavity 311. When the valve main body 402 rotates relative to the housing 102 to a non-communication position, the valve main body 402 can block the first tube 211, the second tube 212, the third tube 213, the fourth tube 214 and the fifth tube 215, so that the fluid cannot flow through the valve assembly. The valve shaft 408 is disposed above the valve main body 402, is formed by extending upwardly from the valve main body 402 and is disposed coaxially with the valve main body 402. The valve gear 406 is disposed above the valve main body 402 and is disposed coaxially with and connected to the valve shaft 408. In an embodiment of the present disclosure, the valve gear 406 is an external gear.

It should be noted that the valve main body 402 in the present disclosure has only one communication position by way of example, so that two of the openings of the valve main body 402 are respectively in communication with two of the tubes, thereby forming a communication path. However, it can be understood by those skilled in the art that in other embodiments, the valve main body 402 may have multiple communication positions and different communication paths may be achieved through the specific arrangement of the openings.

It should be noted that the valve main body 402 in the present disclosure has only one non-communication position by way of example, but it can be understood by those skilled in the art that in other embodiments, the valve main body 402 may have no non-communication position.

It should be noted that although the valve main body 402 shown in the present disclosure is provided with three openings, it can be understood by those skilled in the art that the valve main body 402 being provided with at least one opening is within the scope of protection of the present disclosure.

It should be noted that the valve main body 402, the valve gear 406 and the valve shaft 408 in the present disclosure may be integrally formed or may be connected by a connection method (e.g., welding, snap-fit).

Figure 5:
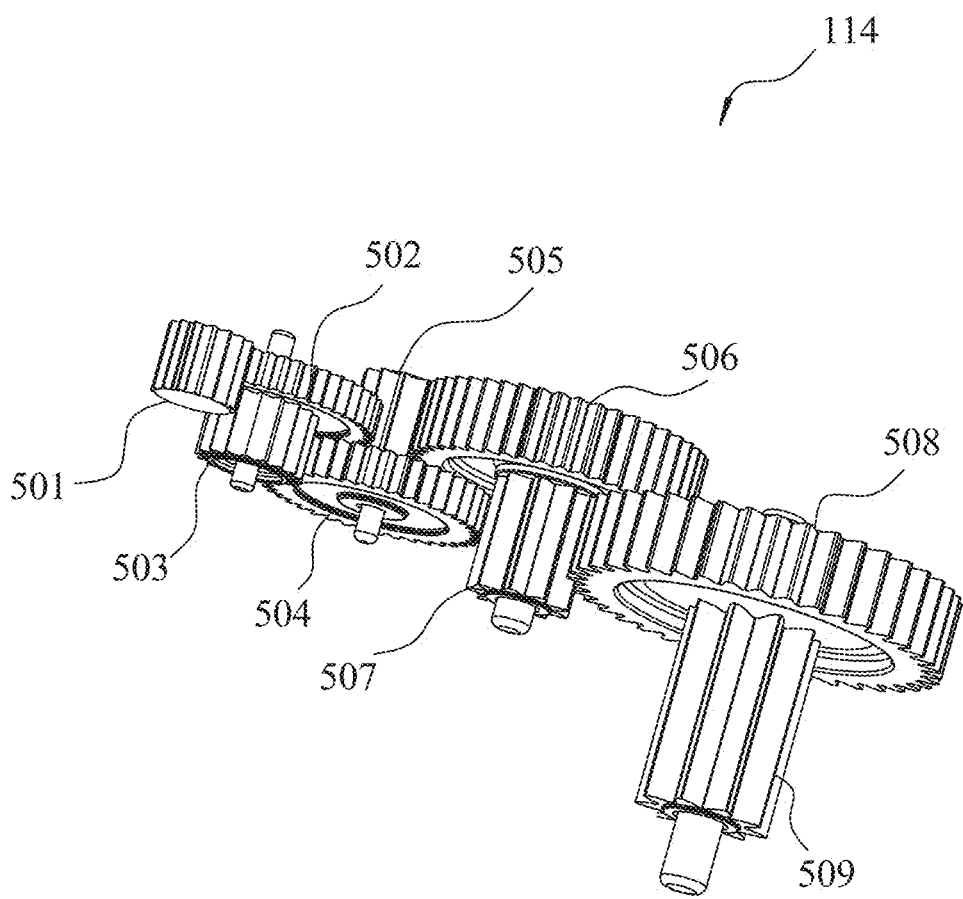
FIG. 5 is a perspective view of a drive train assembly shown in FIG. 1B.

FIG. 5 is a perspective view of the drive train assembly 114 shown in FIG. 1B. The drive train assembly 114 is configured to be capable of transmitting and increasing the torque. As shown in FIG. 5, the drive train assembly 114 includes a first gear 501, a second gear 502, a third gear 503, a fourth gear 504, a fifth gear 505, a sixth gear 506, a seventh gear 507, an eighth gear 508 and a final gear 509. The first gear 501, the second gear 502, the third gear 503, the fourth gear 504, the fifth gear 505, the sixth gear 506, the seventh gear 507, the eighth gear 508 and the final gear 509 are all external gears. The final gear 509 is configured to externally engage with the valve gear 406, and the driving component 116 is configured to drive the first gear 501 to rotate. The first gear 501 externally engages with the second gear 502, the third gear 503 externally engages with the fourth gear 504, the fifth gear 505 externally engages with the sixth gear 506, and the seventh gear 507 externally engages with the eighth gear 508. The second gear 502 is connected to and disposed coaxially with the third gear 503, the fourth gear 504 is connected to and disposed coaxially with the fifth gear 505, the sixth gear 506 is connected to and disposed coaxially with the seventh gear 507, and the eighth gear 508 is connected to and disposed coaxially with the final gear 509. In this way, the rotation of the first gear 501 can drive the final gear 509 to rotate, so that the torque of the driving component 116 is transmitted to the final gear 509 to drive the valve body 112 to rotate.

In addition, the drive train assembly 114 is configured to be capable of increasing the torque. In one embodiment, by setting the numbers of teeth of the gears of the drive train assembly 114, the output torque at the final gear 509 of the driving component 116 is greater than the input torque at the first gear 501. In another embodiment, by setting the diameters of the gears of the drive train assembly 114, the torque output by the final gear 509 of the driving component 116 is greater than the torque input by the first gear 501.

It should be noted that although the drive train assembly 114 shown in the present disclosure includes the first gear 501, the final gear 509, and seven intermediate gears, it can be understood by those skilled in the art that the drive train assembly 114 may include at least one intermediate gear, as long as the first gear 501 can drive the final gear 509 to rotate by means of the at least one intermediate gear. In another embodiment, the drive train assembly 114 may include no intermediate gear, but include only the first gear 501 and the final gear 509 engaging with each other.

It should be noted that although each gear of the drive train assembly 114 and the valve gear 406 shown in the present disclosure are both external gears, it can be understood by those skilled in the art that each gear of the drive train assembly 114 and the valve gear 406 may be gears in a variety of forms. For example, in one embodiment, at least one of each gear of the drive train assembly 114 and the valve gear 406 is an internal gear. In another embodiment, the first gear 501 is a worm and the final gear 509 is a worm gear.

Figure 6:
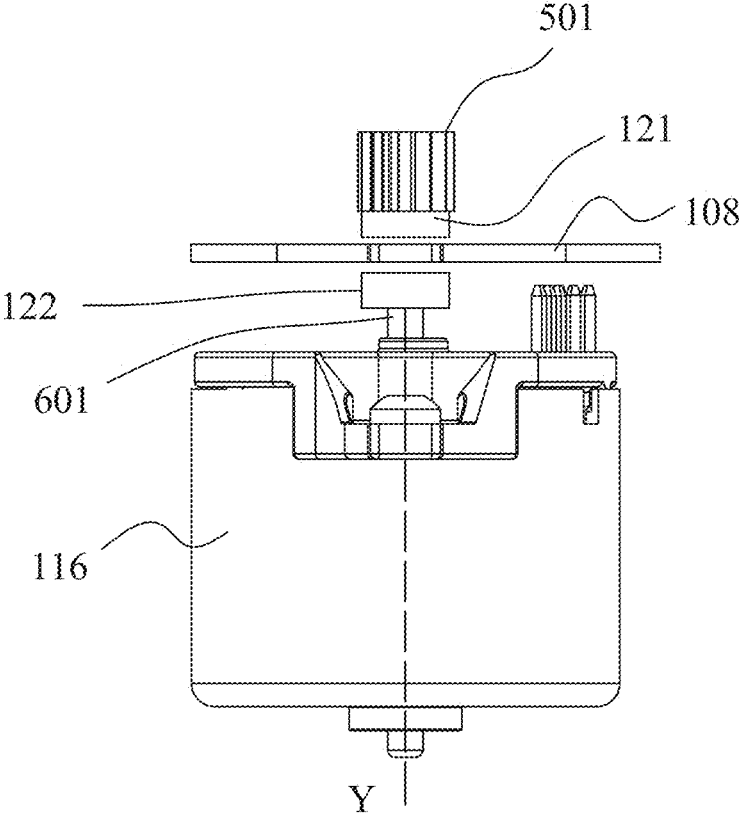
FIG. 6 is a front view of a driving component, a first magnetic component, a second magnetic component, a separator and a first gear of the present disclosure.

FIG. 6 is a front view of the driving component 116, the first magnetic component 121, the second magnetic component 122, the separator 108 and the first gear 501 of the present disclosure, for showing a mating relationship between the above components. As shown in FIG. 6, the driving component 116 has an output end 601. The output end 601 can rotate about an output axis Y and has an output torque. The second magnetic component 122 is disposed on the output end 601. The first magnetic component 121 is disposed on the first gear 501 of the drive train assembly 114. The first magnetic component 121 and the second magnetic component 122 are respectively located on two opposite sides of the separator 108. The first magnetic component 121 and the second magnetic component 122 are configured such that the first magnetic component 121 can rotate correspondingly as the second magnetic component 122 rotates. In other words, the first magnetic component 121 is stationary relative to the second magnetic component 122. In this way, as the second magnetic component 122 rotates, the output torque of the driving component 116 can be transmitted to the drive train assembly 114. The drive train assembly 114 is configured to be capable of converting the output torque of the driving component 116 into a valve body torque capable of driving the valve body 112 to rotate. The output torque is less than the valve body torque. In other words, the driving component 116 can merely provide a relatively small torque to drive the valve body which requires a relatively large torque to rotate.

In the present disclosure, the driving component 116 is a motor. The output torque is 0.009 Nm and the valve body torque is 0.94 Nm.

As shown in FIG. 6, the second magnetic component 122 drives the first magnetic component 121 to rotate by means of a magnetic attraction force. The first magnetic component 121 is separated from the separator 108 by a distance so that no friction is generated between the first magnetic component 121 and the separator 108. The second magnetic component 122 is separated from the separator 108 by a distance so that no friction is generated between the second magnetic component 122 and the separator 108.

It should be noted that in other embodiments, the first magnetic component 121 may be in contact with the separator 108 and/or the second magnetic component 122 may be in contact with the separator 108, thereby helping to reduce an axial force generated by a magnetic field formed by the first magnetic component 121 and the second magnetic component 122.

Figure 7:
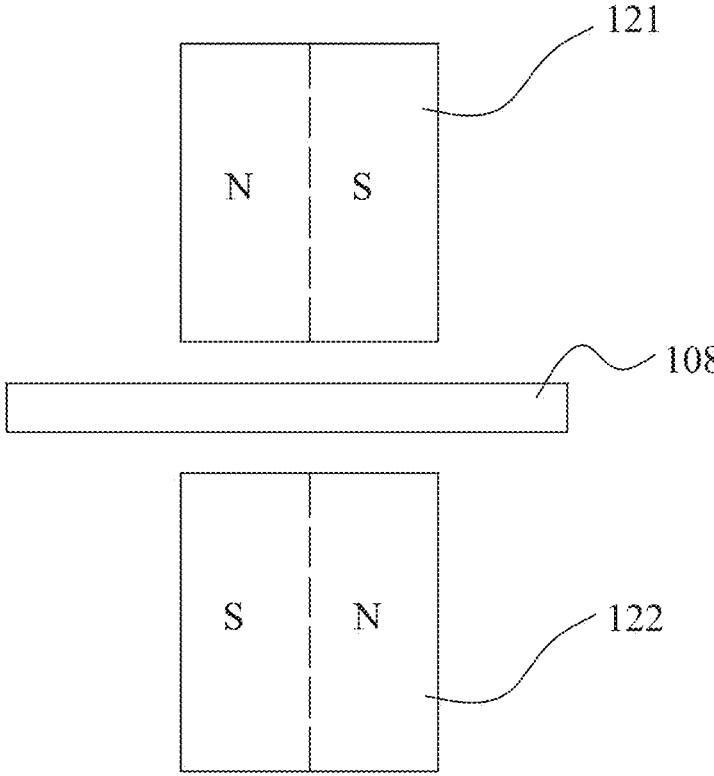
FIG. 7 is a schematic view of a first embodiment of the arrangement of the first magnetic component and the second magnetic component of the present disclosure.

FIG. 7 is a schematic view of a first embodiment of the arrangement of the first magnetic component 121 and the second magnetic component 122 of the present disclosure. As shown in FIG. 7, each of the first magnetic component 121 and the second magnetic component 122 has a first polarity N and a second polarity S. The first polarity N and the second polarity S attract each other, so that the first polarity N and the second polarity S have a tendency to approach each other. The first polarity N of the first magnetic component 121 directly faces the second polarity S of the second magnetic component 122, and the second polarity S of the first magnetic component 121 directly faces the first polarity N of the second magnetic component 122, such that magnetic poles of the first magnetic component 121 and the second magnetic component 122 are correspondingly disposed, to create the greatest attraction force. As a result, the first magnetic component 121 can rotate correspondingly as the second magnetic component 122 rotates.

Figure 8:
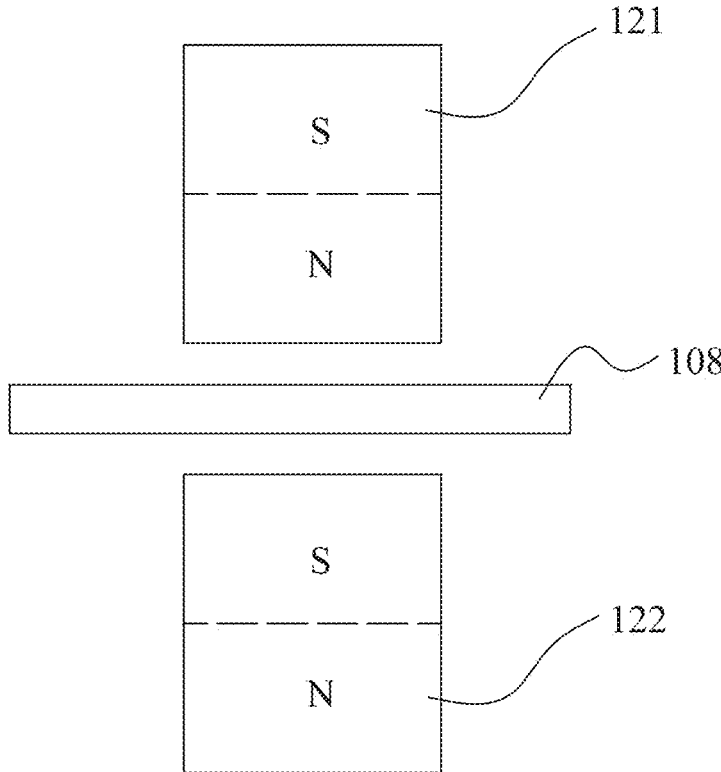
FIG. 8 is a schematic view of a second embodiment of the arrangement of the first magnetic component and the second magnetic component of the present disclosure.

FIG. 8 is a schematic view of a second embodiment of the arrangement of the first magnetic component 121 and the second magnetic component 122 of the present disclosure. As shown in FIG. 8, each of the first magnetic component 121 and the second magnetic component 122 has a first polarity N and a second polarity S. The first polarity N and the second polarity S attract each other, so that the first polarity N and the second polarity S have a tendency to approach each other. The first polarity N of the first magnetic component 121 directly faces the second polarity S of the second magnetic component 122, and the second polarity S of the first magnetic component 121 is away from the first polarity N of the second magnetic component 122. In other words, the first polarity N of the first magnetic component 121 is closer to the second polarity S of the second magnetic component 122 than the second polarity S of the first magnetic component 121, and the first polarity N of the second magnetic component 122 is farther away from the first polarity N of the first magnetic component 121 than the second polarity S of the second magnetic component 122. Since the first polarity N of the first magnetic component 121 directly faces the second polarity S of the second magnetic component 122, the first magnetic component 121 and the second magnetic component 122 also have an attraction force, so that the first magnetic component 121 can rotate correspondingly as the second magnetic component 122 rotates.

In the first embodiment and the second embodiment of the arrangement of the first magnetic component 121 and the second magnetic component 122 described above, the first magnetic component 121 and the second magnetic component 122 are cylindrical.

It should be noted that the first magnetic component 121 and the second magnetic component 122 in an embodiment of the present disclosure are single magnet units. That is, the first magnetic component 121 and the second magnetic component 122 have only one first polarity and one second polarity, respectively. Therefore, when magnetizing the first magnetic component 121 and the second magnetic component 122, only simple magnetization is required, and complex multi-pole magnetization is not required.

It should also be noted that although only one first magnetic component 121 and one second magnetic component 122 disposed on two opposite sides of the separator 108 are shown in the embodiment of the present disclosure, the combination of at least one first magnetic component and at least one second magnetic component is within the scope of protection of the present disclosure.

In the prior art, since the driving component cannot contact the fluid, it is necessary to provide a seal in the housing to isolate the fluid from the driving component. It has since been discovered that, the provision of the seal increases the required capacity of the housing, resulting in a relatively large volume of the valve assembly. In addition, the seal needs to be manufactured and assembled separately, increasing the production cost. Moreover, since the seal is disposed between the housing and the valve body, the rotation of the valve body needs to overcome a friction force generated by the seal. As a result, the driving component needs to provide more torque. A driving component capable of outputting a higher torque has a larger volume and is more expensive.

The present disclosure provides a valve assembly, including a first cavity and a second cavity which are independent of each other and transmitting power by means of a first magnetic component and a second magnetic component disposed in the first cavity and the second cavity, respectively. A separator is provided between the first cavity and the second cavity, such that a fluid in the first cavity does not flow into the second cavity, nor does it flow into a driving component provided in the second cavity, thereby eliminating the need for a seal while protecting the driving component.

In addition, the first magnetic component and the second magnetic component of the present disclosure are disposed on a drive train assembly and the driving component, respectively. The drive train assembly can increase the torque, so that a relatively small output torque of the driving component is converted into a relatively large valve body torque capable of driving the valve body to rotate. Since the second magnetic component drives the first magnetic component to rotate with a relatively small torque, the second magnetic component can drive the first magnetic component to rotate by means of a relatively small attraction force between the first magnetic component and the second magnetic component. That is, the second magnetic component can drive the first magnetic component to rotate by means of a relatively small magnetic field strength between the first magnetic component and the second magnetic component.

Figure 9:
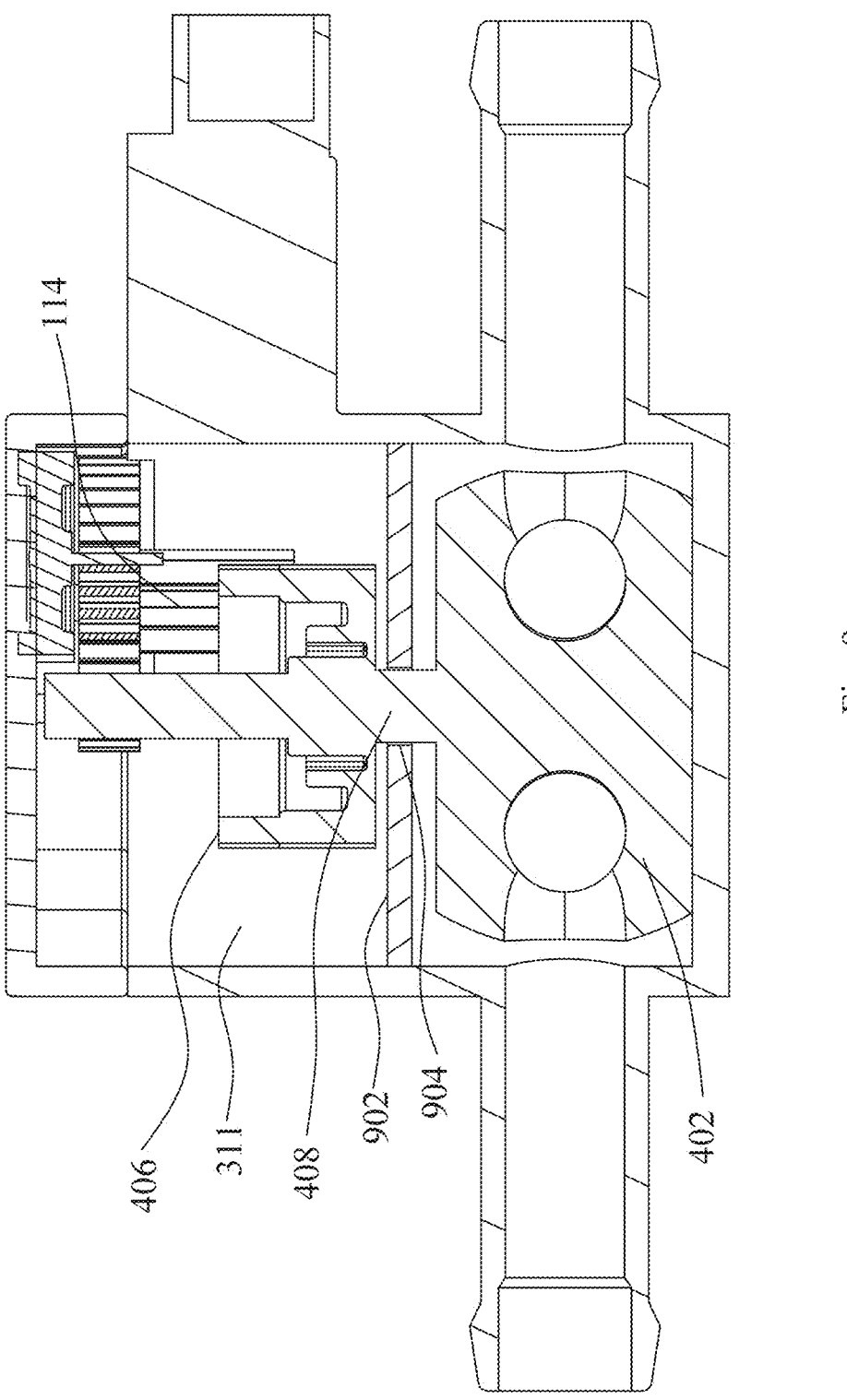
FIG. 9 is a cross-sectional view of a second embodiment of a valve assembly of the present disclosure.

FIG. 9 is a cross-sectional view of a second embodiment of a valve assembly of the present disclosure. The embodiment shown in FIG. 9 differs from the embodiment shown in FIGS. 1A-7 in that the valve assembly shown in FIG. 9 further includes an additional plate 902. The additional plate 902 is disposed transversely in the first cavity 311, thereby substantially dividing the first cavity 311 into two portions located on upper and lower sides of the additional plate 902. The additional plate 902 is provided with a communication hole 904. The valve shaft 408 can pass through the communication hole 904. The valve main body 402 and the valve gear 406 are disposed on two opposite sides (i.e., the upper and lower sides) of the additional plate 902, respectively, and the valve main body 402 and the drive train assembly 114 are also disposed on the two opposite sides (i.e., the upper and lower sides) of the additional plate 902, respectively.

Figure 10A:
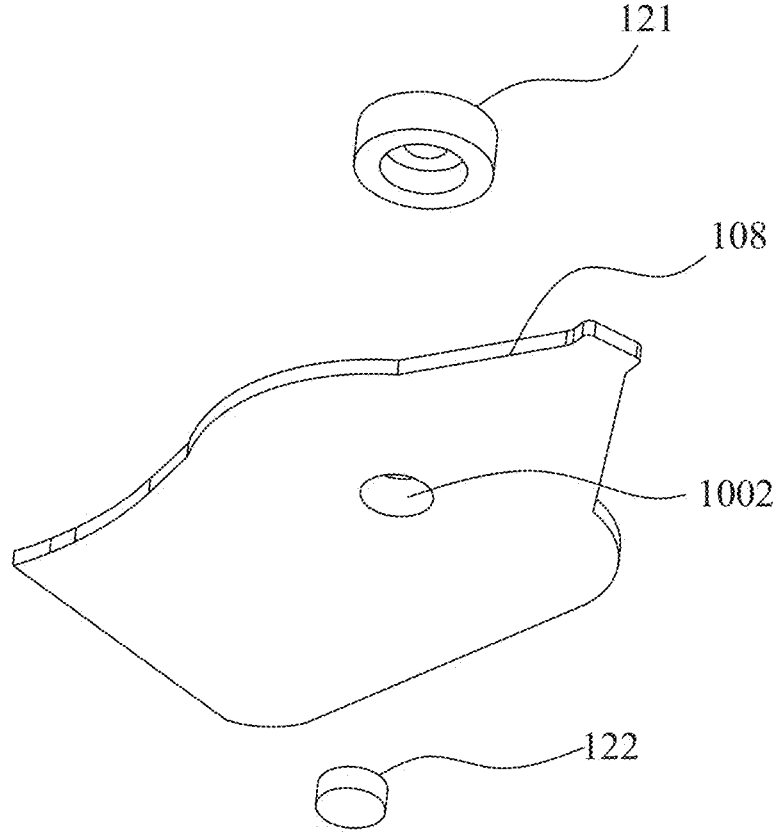
FIGS. 10A-10B are partial perspective views of a third embodiment of a valve assembly of the present disclosure.
Figure 10B:
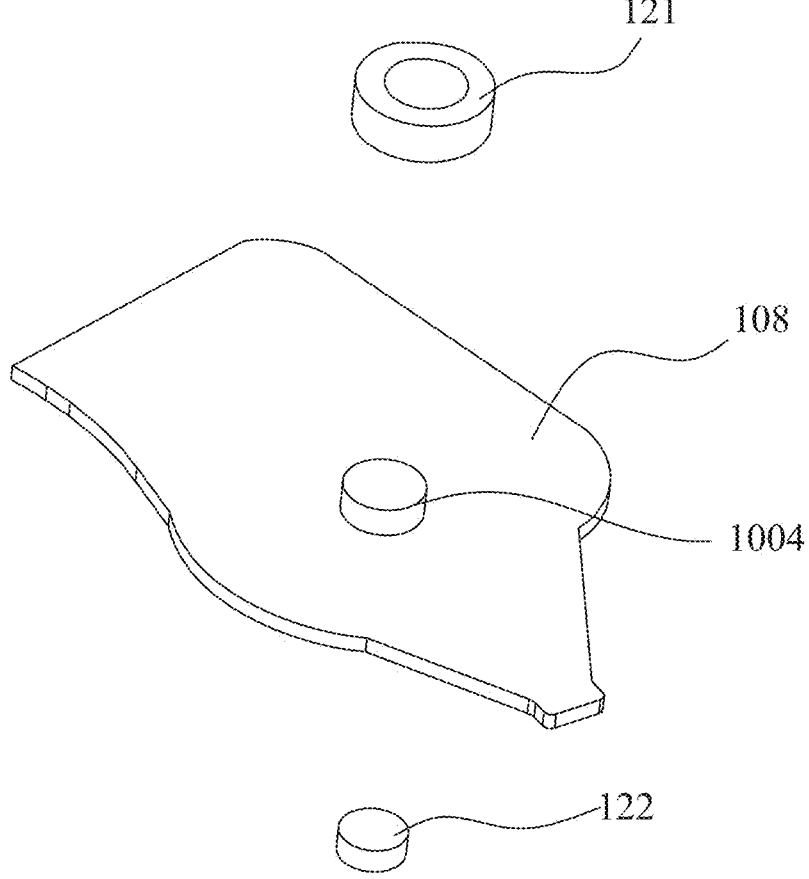
Figure 10C:
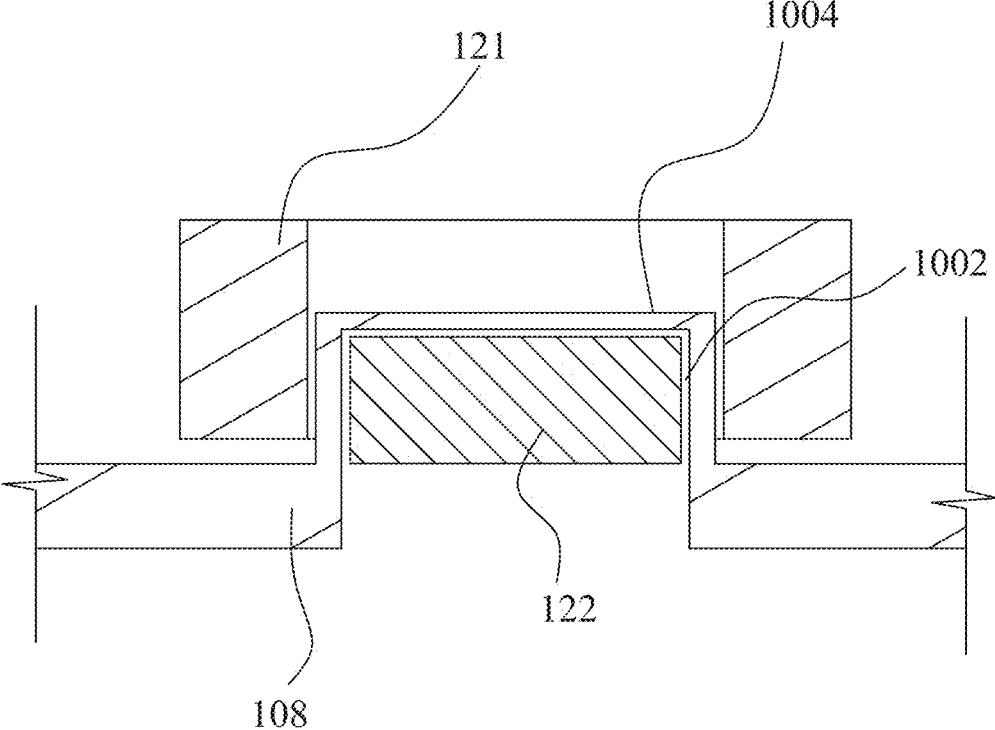
FIG. 10C is a partial cross-sectional view of the third embodiment of the valve assembly of the present disclosure.

FIGS. 10A-10B are partial perspective views of a third embodiment of a valve assembly of the present disclosure, and FIG. 10C is a partial cross-sectional view of the third embodiment of the valve assembly of the present disclosure, for showing the specific structures of the first magnetic component 121, the second magnetic component 122 and the separator 108 in the third embodiment. As shown in FIGS. 10A-10C, the first magnetic component 121 is cylindrical and the second magnetic component 122 is annular. The second magnetic component 122 can be disposed and surrounded by the first magnetic component 121. The separator 108 is substantially flat. The separator 108 is provided with a circular counter bore 1002. Specifically, the counter bore 1002 is formed by extending upwardly from a lower surface of the separator 108, and the counter bore 1002 does not penetrate the separator 108, so that a protruding cylindrical protrusion 1004 is formed on the separator 108. The first magnetic component 121 is received in the counter bore 1002. The second magnetic component 122 is disposed and surrounded the cylindrical protrusion 1004, and is thus disposed and surrounded by the first magnetic component 121.

In this way, in this embodiment, by disposing and surrounding the second magnetic component 122 about the first magnetic component 121, the space utilization of the first magnetic component 121 and the second magnetic component 122 in a longitudinal direction (i.e., the height direction of the first magnetic component 121 and the second magnetic component 122) is increased, so that the arrangement in the valve assembly is more compact.

Figure 11:
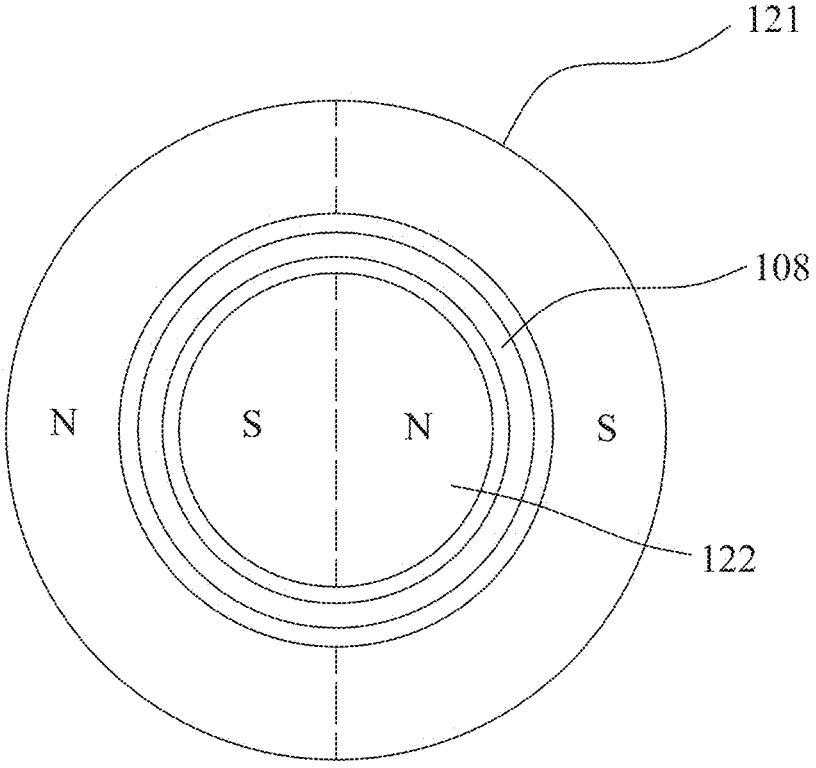
FIG. 11 is a schematic view of a third embodiment of the arrangement of the first magnetic component and the second magnetic component of the present disclosure.

FIG. 11 is a schematic view of a third embodiment of the arrangement of the first magnetic component 121 and the second magnetic component 122 of the present disclosure. Each of the first magnetic component 121 and the second magnetic component 122 has a first polarity N and a second polarity S. The first polarity N and the second polarity S attract each other, so that the first polarity N and the second polarity S have a tendency to approach each other. In a radial direction of the first magnetic component 121 and the second magnetic component 122, the first polarity N of the first magnetic component 121 directly faces the second polarity S of the second magnetic component 122, and the second polarity S of the first magnetic component 121 directly faces the first polarity N of the second magnetic component 122, such that magnetic poles of the first magnetic component 121 and the second magnetic component 122 are correspondingly disposed, to create the greatest attraction force. As a result, the first magnetic component 121 can rotate correspondingly as the second magnetic component 122 rotates.

In the present disclosure, the second magnetic component 122 is disposed on the output end 601 of the driving component 116, and the first magnetic component 121 is disposed on the first gear 501 of the drive train assembly 114. In this way, the first magnetic component 121 and the second magnetic component 122 are positioned relative to each other without the need for other auxiliary components (e.g., a mounting component or an alignment component for disposing the first magnetic component 121 and the second magnetic component 122 coaxially), thereby reducing the overall size of the valve assembly. In addition, since the second magnetic component 122 is disposed and surrounded the first magnetic component 121, the first magnetic component 121 and the second magnetic component 122 are each subjected to two attraction forces with the same magnitude and opposite directions. The attraction forces acting on each of the first magnetic component 121 and the second magnetic component 122 will not make them have tendency to move in a non-rotational direction (e.g., in a linear direction). In addition, the cost of the annular magnetic component (e.g., the second magnetic component 122 in the third embodiment of the valve assembly) is lower than the cost of the cylindrical magnetic component (e.g., the first magnetic component 121).

While the present method and/or system has been described with reference to certain implementations, it will be understood by those skilled in the art that various changes may be made, and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A valve assembly, comprising:
a housing defining a first cavity and a second cavity that are independent of each other;
a valve body being disposed in the first cavity;
a drive train assembly being disposed in the first cavity and configured to be capable of driving the valve body to rotate;
a first magnetic component being disposed in the first cavity and disposed on the drive train assembly;
a driving component being disposed in the second cavity; and
a second magnetic component being disposed in the second cavity and disposed on the driving component;
wherein the first magnetic component and the second magnetic component are configured such that the first magnetic component can rotate correspondingly as the second magnetic component rotates;
wherein the driving component is capable of driving the valve body to rotate by means of the first magnetic component, the second magnetic component and the drive train assembly.

2. The valve assembly according to claim 1,
wherein the driving component has an output torque, and the first magnetic component and the second magnetic component are capable of transmitting the output torque of the driving component to the drive train assembly,
wherein the drive train assembly is configured to convert the output torque into a valve body torque capable of driving the valve body to rotate, and
wherein the output torque is less than the valve body torque.

3. The valve assembly according to claim 1,
wherein the drive train assembly comprises a first gear and a final gear, and the first gear engages with the final gear;
wherein the first magnetic component is disposed on the first gear, and the final gear engages with a valve gear disposed on the valve body.

4. The valve assembly according to claim 1,
wherein the drive train assembly comprises a first gear, a final gear and at least one intermediate gear, and the first gear is capable of driving the final gear to rotate by means of the at least one intermediate gear, and
wherein the first magnetic component is disposed on the first gear, and the final gear is configured to drive the valve body to rotate.

5. The valve assembly according to claim 1, wherein the second magnetic component drives the first magnetic component to rotate by means of a magnetic attraction force.

6. The valve assembly according to claim 5,
wherein each of the first magnetic component and the second magnetic component has a first polarity and a second polarity which are attractive to each other; and
wherein the first polarity of the first magnetic component directly faces the second polarity of the second magnetic component, and the first polarity of the second magnetic component directly faces the second polarity of the first magnetic component.

7. The valve assembly according to claim 6, wherein the first magnetic component and the second magnetic component are cylindrical.

8. The valve assembly according to claim 6,
wherein the housing comprises a separator disposed between the first cavity and the second cavity; and
wherein the separator is a flat plate, and the first magnetic component and the second magnetic component are disposed on two opposite sides of the separator.

9. The valve assembly according to claim 6, wherein the first magnetic component is cylindrical, the second magnetic component is annular, and the second magnetic component is disposed and surrounded about the first magnetic component.

10. The valve assembly according to claim 9,
wherein the housing comprises a separator disposed between the first cavity and the second cavity;
wherein the first magnetic component and the second magnetic component are disposed on two opposite sides of the separator; and
wherein the separator is provided with a counter bore, and the first magnetic component is received in the counter bore.

11. The valve assembly according to claim 5,
wherein each of the first magnetic component and the second magnetic component has a first polarity and a second polarity which are attractive to each other; and
wherein the first polarity of the first magnetic component is closer to the second polarity of the second magnetic component than the second polarity of the first magnetic component, and the first polarity of the second magnetic component is farther away from the first polarity of the first magnetic component than the second polarity of the second magnetic component.

12. The valve assembly according to claim 1, wherein the first magnetic component is stationary relative to the second magnetic component.

13. The valve assembly according to claim 1, wherein the driving component has a rotatable output end, and the second magnetic component is disposed on the output end.

14. The valve assembly according to claim 1, wherein the driving component is a motor.

15. The valve assembly according to claim 1,
wherein the housing comprises at least two tubes in communication with the first cavity, and a fluid is capable of flowing into the first cavity through one of the at least two tubes; and
wherein the valve body is provided with at least one opening, and the at least one opening is configured to enable the at least two tubes to communicate with each other, such that the fluid can flow out of the first cavity from the other of the at least two tubes.

16. The valve assembly according to claim 1, further comprising an additional plate being disposed in the first cavity and being provided with a communication hole,

wherein the valve body comprises a valve main body, a
valve gear and a valve shaft, the valve gear is connected
to the valve main body via the valve shaft, the valve
gear engages with the drive train assembly, and the
valve shaft is capable of passing through the communication hole, and
wherein the valve main body and the drive train assembly
are respectively disposed on two opposite sides of the
additional plate, and the valve main body and the valve
gear are respectively disposed on the two opposite sides
of the additional plate.

\* \* \* \* \*